United States Patent [19]

Zebuhr

[11] 4,254,636
[45] Mar. 10, 1981

[54] HEAT TRANSFER SYSTEM

[75] Inventor: William H. Zebuhr, Nashua, N.H.

[73] Assignee: Sunhouse Incorporated, Nashua, N.H.

[21] Appl. No.: 864,324

[22] Filed: Dec. 27, 1977

Related U.S. Application Data

[63] Continuation of Ser. No. 742,346, Nov. 16, 1976, Pat. No. 4,144,999.

[51] Int. Cl.$^3$ .............................................. F25B 29/00
[52] U.S. Cl. ...................................... 62/325; 126/427; 126/430; 165/47; 165/18; 165/58; 165/60; 62/238.6; 251/211; 251/304
[58] Field of Search ...................... 62/325, 2, 238 E; 219/314, 365; 237/1 A, 2 B; 98/33, 38; 137/25, 357, 362; 165/18, 104 R, 47, 48, 58, 60, 64, 74, 122; 251/211, 304, 133

[56] References Cited

U.S. PATENT DOCUMENTS

| 2,396,338 | 3/1946 | Newton | 62/2 |
|---|---|---|---|
| 2,495,878 | 1/1950 | Tull | 62/399 X |
| 2,632,306 | 3/1953 | Ruff | 165/29 |
| 2,713,252 | 7/1955 | Jackson et al. | 165/18 |
| 2,751,155 | 6/1956 | Collat | 165/18 |
| 2,767,639 | 10/1956 | Johnson et al. | 98/38 |
| 2,943,842 | 7/1960 | Sullivan | 165/18 |
| 2,999,370 | 9/1961 | Eberhart | 62/427 |
| 3,282,468 | 11/1966 | Karlen | 219/314 |
| 3,548,923 | 12/1970 | Nakano et al. | 219/365 |
| 3,636,721 | 1/1972 | Harland | 62/325 X |
| 3,946,575 | 3/1976 | Barr et al. | 98/33 R |
| 3,960,527 | 11/1974 | Goettl | 62/427 |
| 3,968,832 | 7/1976 | Regenass | 165/58 |
| 3,996,759 | 12/1976 | Meckler | 165/18 |
| 4,012,920 | 3/1977 | Kirschbaum | 126/271 X |
| 4,027,821 | 6/1977 | Hayes et al. | 237/1 A |
| 4,034,738 | 7/1977 | Barber, Jr. | 237/1 A |
| 4,049,045 | 9/1977 | Moog et al. | 165/29 X |
| 4,108,374 | 8/1978 | Lyon et al. | 237/1 A |
| 4,111,360 | 9/1978 | Barr | 237/1 A |

FOREIGN PATENT DOCUMENTS

| 2607926 | 6/1977 | Fed. Rep. of Germany | 137/255 |
|---|---|---|---|
| 167906 | 3/1934 | Switzerland | 62/238 B |

*Primary Examiner*—Henry C. Yuen
*Assistant Examiner*—Henry Bennett
*Attorney, Agent, or Firm*—Albert Gordon

[57] ABSTRACT

A heat transfer system for using solar energy to modify the temperatures of conditioned space in a building and to supply domestic hot water for the building. Part of the system is mounted to a core that forms a structural column of the building. The system incorporates selector mechanisms for selectively altering the flow of water in the system to facilitate changes in the functioning of the system.

3 Claims, 20 Drawing Figures

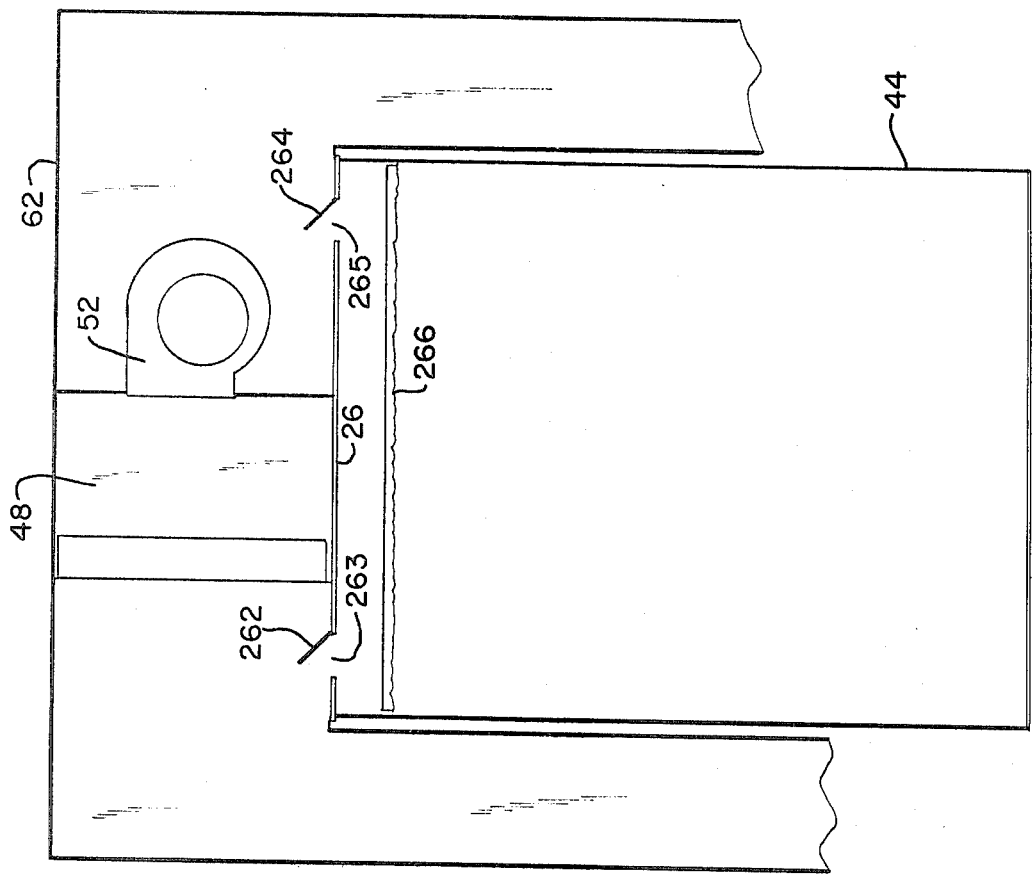
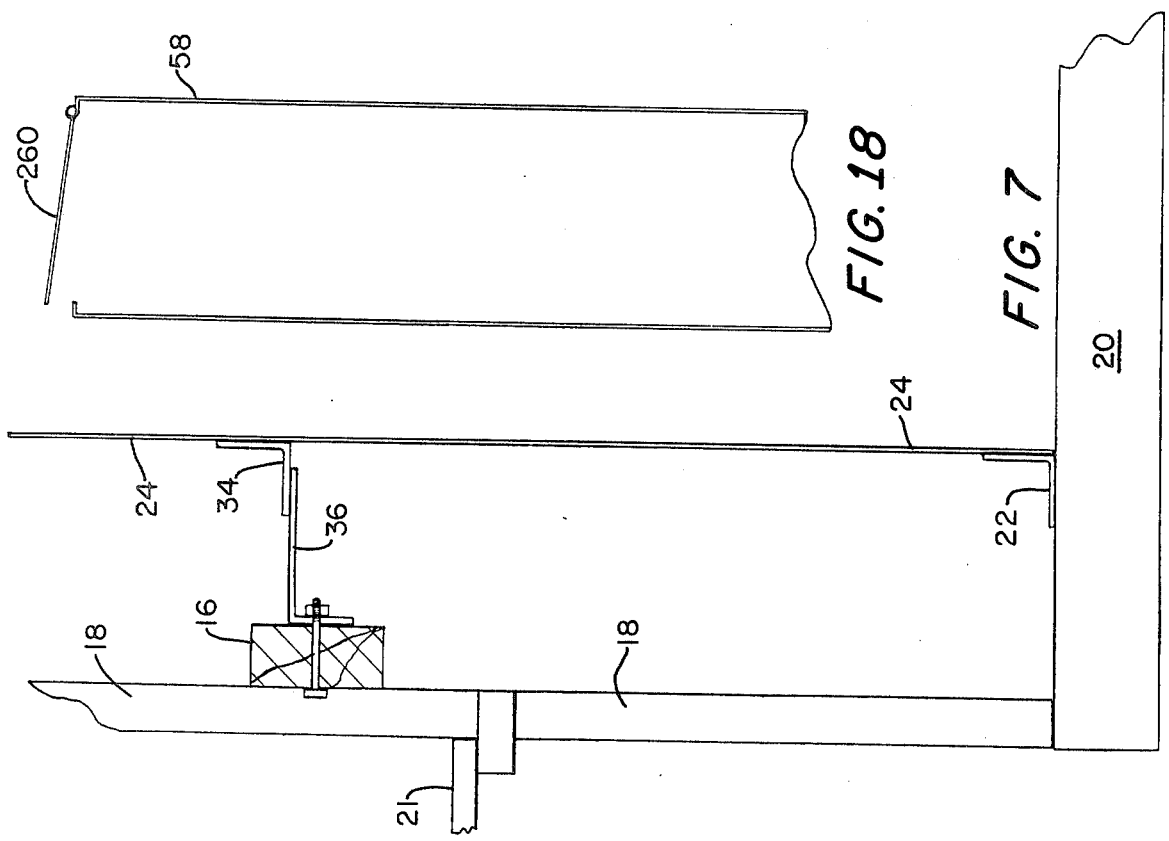

HEAT TRANSFER SYSTEM

This is a continuation in part of application Ser. No. 742,346 filed Nov. 16, 1976, which is now U.S. Pat. No. 4,144,999.

BACKGROUND AND SUMMARY OF THE INVENTION

Many heat transfer systems have been developed using solar energy to modify the temperature of desired portions of a building, hereafter called the "conditioned space", and to supply domestic hot water for the building. It is the object of this invention to provide such a system that is versatile, economical and efficient in modifying the temperature and humidity of the conditioned space of the building and in supplying domestic hot water.

A first aspect of the invention deals with a core that is adapted to be separately manufactured and installed as a unit during the construction of the building and that serves as a structural columnar component of the building. The core includes components of the heat transfer system and thus effects economics in the building construction. The core includes a framework that is attached to structural components of the building and a water tank located interiorly of the core and connected to the core. An air transmission mechanism is mounted to the core for conveying air to the conditioned space. A water operated system is also mounted to the core for modifying the temperature of the air being conveyed to the conditioned space.

The air is conveyed to the conditioned space by a blower that blows the air from the entrance end to the exit end of an enclosure. The temperature of the air is modified by water flowing through a heat exchanger located in the enclosure. The water is pumped through the heat exchanger from either a first tank section or a second tank section. A second aspect of the invention is concerned with an arrangement for the selective pumping of the water from a desired tank section using the same pump. This is accomplished by providing a selector mechanism movable between a first position and a second position and a conduit means so constructed that, when the selector mechanism is in one position, the the pump forces water from the first tank section through the heat exchanger and back to the first tank section and, when the selector mechanism is in its other position, the pump forces water from the second tank section through the heat exchanger and back to the second tank section.

A third aspect of the invention is concerned with the use of a heat pump to enable heated water to flow through the heat exchanger and thus cause the air flowing past the heat exchanger to be heated. As is conventional, the heat exchanger comprises an evaporator, a condenser and an arrangement for causing a refrigerant composition to flow from the evaporator where the refrigerant composition extracts heat from the space adjacent the evaporator to the condenser where the heat is transferred from the condenser. In accordance with this aspect of the invention, the heat is transferred to water flowing through a water passage in the condenser and this water is caused to flow in a closed circuit from the water passage through the heat exchanger and back to the water passage.

The heat transfer system includes a solar collector so connected to the first and second tank sections as to enable water to be circulated to one or the other tank section and then back to the solar collector to thereby heat the water in the tank sections. A fourth aspect of the inventions deals with an effective and economical arrangement for circulating the water from the solar collector to either the first or the second tank section using a single pump. This is accomplished by providing a selector mechanism movable between a first position and a second position. The selector system is so related to the water circulation system and to the pump that, when the selector mechanism is in its first position, the pump pumps water from the solar collector to the first tank section and back to the solar collector and, when the selector mechanism is in its second position, the pump pumps water from the solar connector to the second tank section and back to the solar collector.

The solar collector and the tank are so related that the upper level of the water in the tank is higher than the lowermost level of the water in the solar collector and the water, in being pumped between the solar collector and the tank, flows through pipes or conduits that are so arranged that the water flowing from the tank to the solar collector is forced from the tank at a higher level than the lowermost level of the water in the solar collector. A normally closed drain device is placed in the conduit line flowing from the tank to the solar collector in a segment of the conduit line that is below the level of the solar collector so as to enable the water in the solar collector to be drained by opening the drain device. The opening of the drain device creates the problem of undesired siphoning of water from the tank through the conduit line to the drain device. In accordance with a fifth aspect of the invention, this problem is solved by incorporating in a segment of the conduit line that is between the tank and the drain device and that is at a higher level than the water in the tank a vent that is open to atmosphere.

The heat transfer system includes a pump driven conduit arrangement for removing the water from the solar collector back to the tank. Instead of using the same pump, for this purpose, as the pump that circulates the water from the tank through the solar collector and back to the tank which would require a relatively expensive reversible pump motor and valving, in accordance with a sixth aspect of the invention a pump that is separate from the pump that circulates the water from the tank through the solar collector and back to the tank is utilized to remove the water from the solar collector. The heat transfer system has two conduit systems, each of which incorporates one of the pumps, and a selector arrangement so integrated into the conduit systems as to selectively render one or the other of the conduit systems operational.

A seventh aspect of the invention relates to a humidification system for humidifying the air flowing through the enclosure. Ducts are provided between the enclosure and the top of the tank above the water in the tank to enable water vapor from the tank to be added to the air flowing through the tank. In order to prevent minerals from the water in the tank from being added to the air flowing through the enclosure and in order to prevent an excessive accumulation of minerals in the tank, in accordance with this aspect of the invention a mineral trap of porous material having substantially the same external dimensions as the internal dimensions of the tank is located within the tank and floats on the water in the tank.

An eighth aspect of the invention deals with the construction of the selector mechanism. The selector mechanism has a back plate with a number of holes extending therethrough that are in excess of and a multiple of two, a front plate having two holes extending therethrough, a rotatable body interposed between the plates that is indexable by its rotation into a plurality of positions, and passages through the body so constructed that in each of the body positions a different pair of holes extending through the backplate are in communication with the holes extending through the front plate.

BRIEF DESCRIPTION OF THE DRAWINGS

FIG. 7 is a section taken along the line 7—7 of FIG. 6;

FIG. 18 shows the top of an inlet duct that is part of the system;

FIG. 19 is a view of the top of the tank showing the humidification system; and

DESCRIPTION OF THE PREFERRED EMBODIMENT

Figure 1:
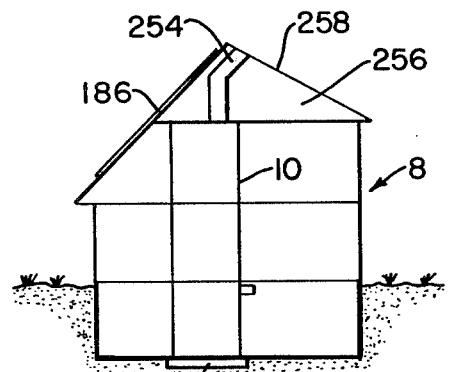
FIG. 1 is a view of the building with the core mounted therein.

FIG. 1 shows a building 8 having a core 10 mounted therein generally in the center of the building. The core is intended, in the manner described below, to form a structural column of the building.

Referring to FIGS. 2-7, the core 10 includes a rectangular framework 12 open at its top and bottom and comprised of corner posts 14, horizontal beams 16 extending between the posts 14 at spaced vertical intervals, and intermediate vertical posts 18 extending between the corner posts 14. The members 14, 16 and 18 are so secured to each other as to form a rigid assembly. The framework 12 is supported on a suitable pad or base 20 (see FIGS. 1, 3 and 7) in the interior of the building. The base 20 may be the basement of the building or may be specially prepared in the building. The posts 14 and 18 and the beams 16 that are located upwardly of the base 20 are anchorable, by conventional fastening means, to component parts 21 of the encompassing building structure such as the building floor or floors, the building walls, the building joists, etc. (see FIG. 7).

Figure 3:
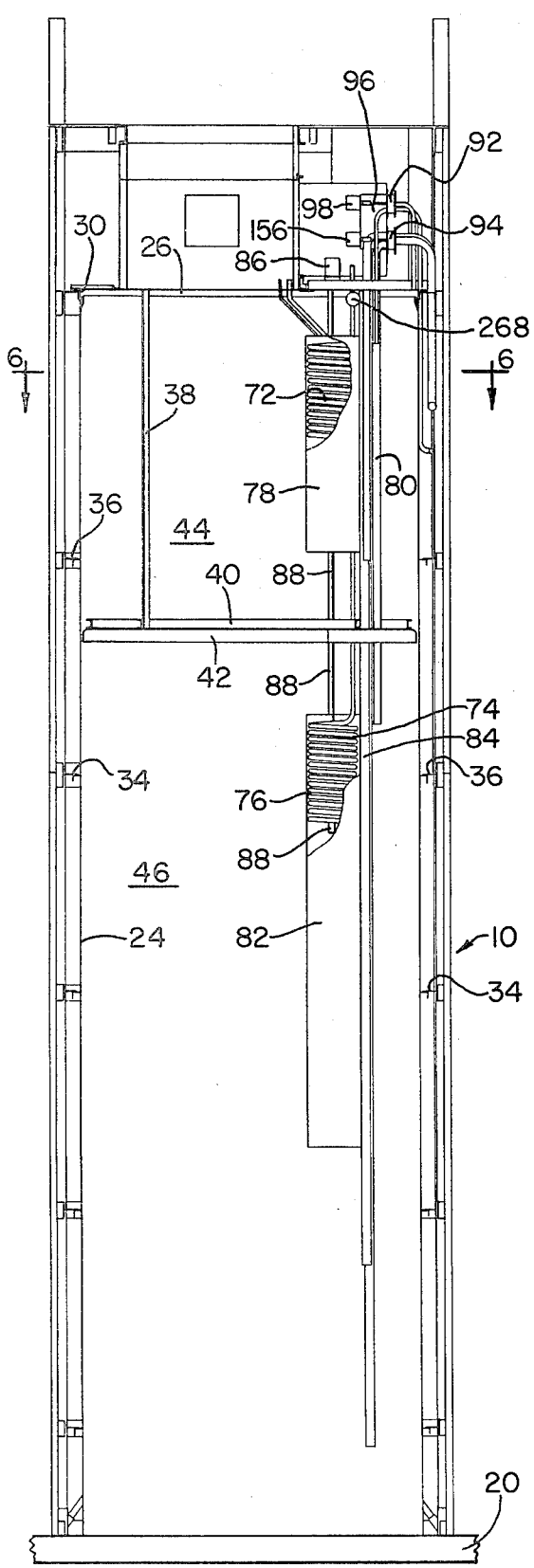
FIG. 3 is a section in elevation of the core taken along the line 3—3 of FIG. 2.

Referring to FIGS. 3 and 7, a hollow tank 24 of circular cross-section is mounted within the framework 12 and rests on the base 20. The tank 24 may be fastened to the base 20 by angle brackets 22. The tank 24 extends upwardly of the base 20 most of the way to the top of the framework 12 and a tank top 26 covers the top of the tank and is secured thereto. Optionally, a plastic liner (not shown) may be anchored to the tank top by clips 30 (FIG. 3) so as to extend downwardly of the tank top 26 along the inner periphery of the tank, the liner having a bottom located proximate to the base 20. The liner would thus function as a container for a quantity of water. If the liner is not used, the tank itself functions as the water container.

Figure 6:
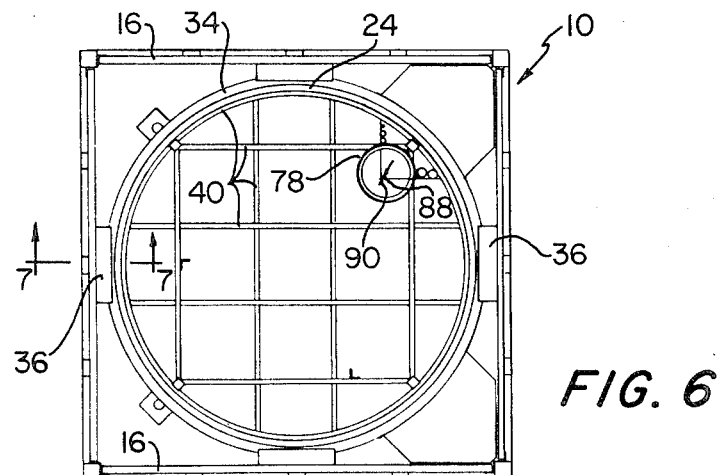
FIG. 6 is a section taken along the line 6—6 of FIG. 3.

Referring to FIGS. 3, 6, and 7, a plurality of horizontal rings 34 circumscribe the tank 24 at spaced vertical intervals and are rigidly anchored to the tank. Brackets 36, made of relatively flexible material, are secured, as by welding, at 90 degree intervals to each ring 34 in regions of the rings 34 that are proximate to the beams 16 and each bracket 36 is anchored to a beam 16. The rings 34 and the brackets 36 thus serve as means for securing the tank 24 to the framework 12. The flexibility of the brackets 36 enables the framework 12 and the tank 24 to accommodate each other to changes in their dimensions due to moisture in the wood out of which the framework 12 is made and to heat in the metal out of which the tank 24 is made. Such changes cause relative vertical movement of the framework 12 and the tank 24 which are accommodated by flexure of the flexible brackets 36.

As shown in FIG. 6, in their horizontal planes each bracket 36 has a greater dimension tangentially of the tank 24 than a dimension radially of the tank 24. The relatively great tangential dimension enables the tank 24 to resist torque about its vertical axis that is imparted to the tank 24 by the framework 12 if the building 8 is subjected to stresses, as by high winds, that impart tangential components of force to the brackets 36. The relatively small radial dimensions of the brackets 36 prevent the brackets from buckling at their areas of connection to the tank 24 pursuant to relative vertical displacement between the tank 24 and the framework 12.

Referring to FIGS. 3 and 6, a plurality of bars 38, only one of which is shown in FIG. 3, depend from the tank top 26. A grillwork 40 is so mounted to the bottoms of the bars 38 as to extend across the interior of the tank 24 within the liner 28. A barrier 42 of heat insulative material, such as polyurethane, is so mounted to the grillwork 40 as to divide the tank 24 into an upper tank section 44 and a lower tank section 46.

Figure 4:
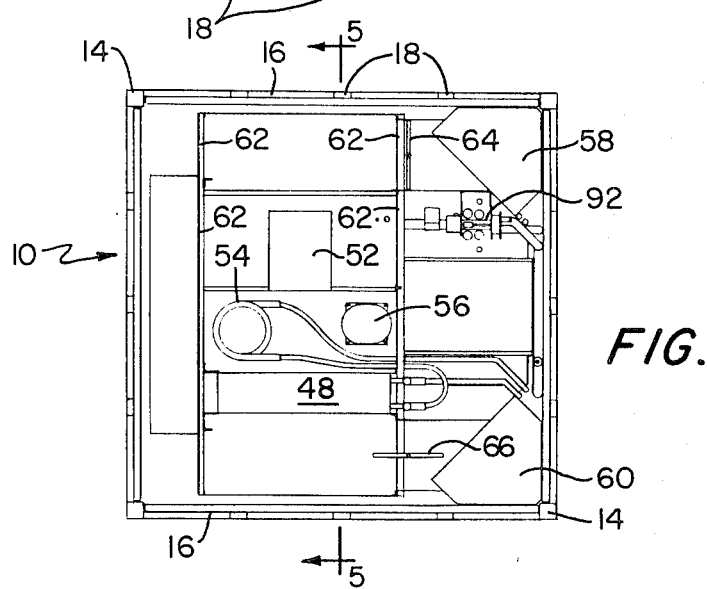
FIG. 4 is a plan view of the core.
Figure 5:
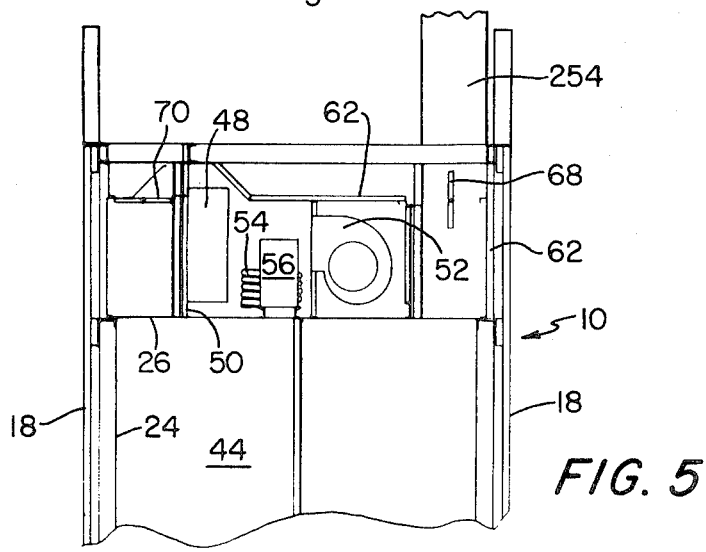
FIG. 5 is a section taken along the line 5—5 of FIG. 4.
Figure 8:
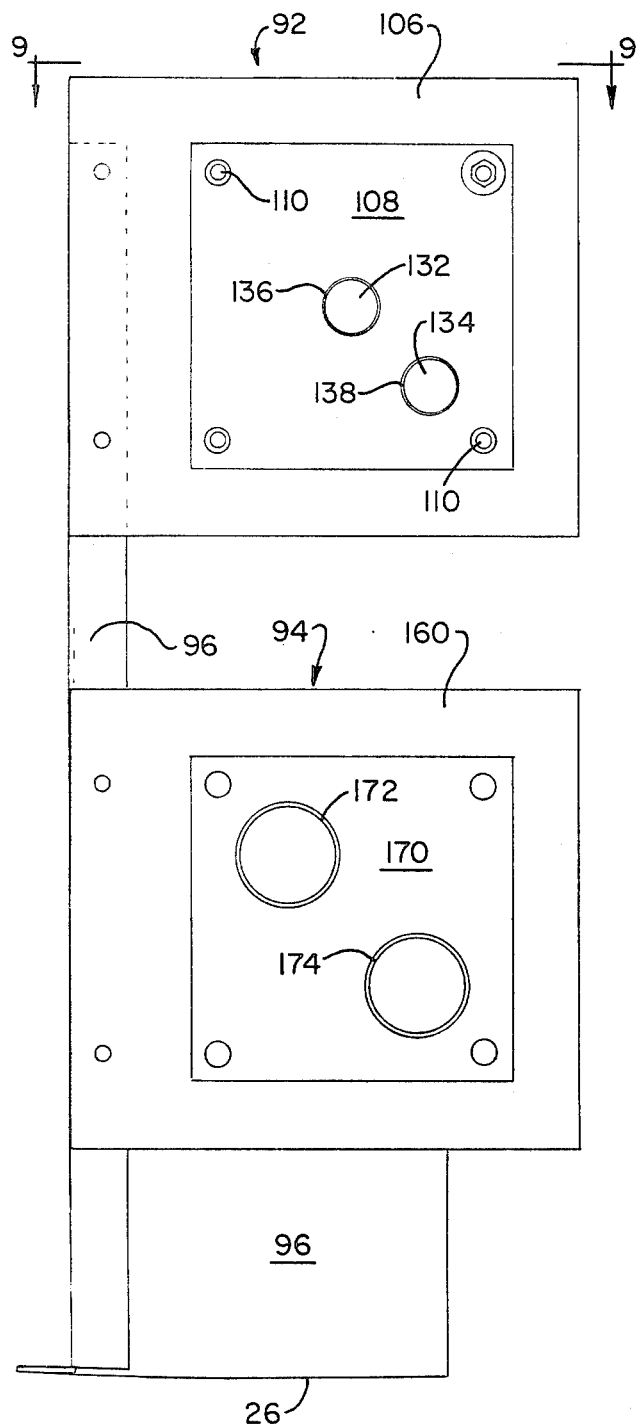
FIG. 8 is an elevation of a pair of selector mechanisms.
Figure 10:
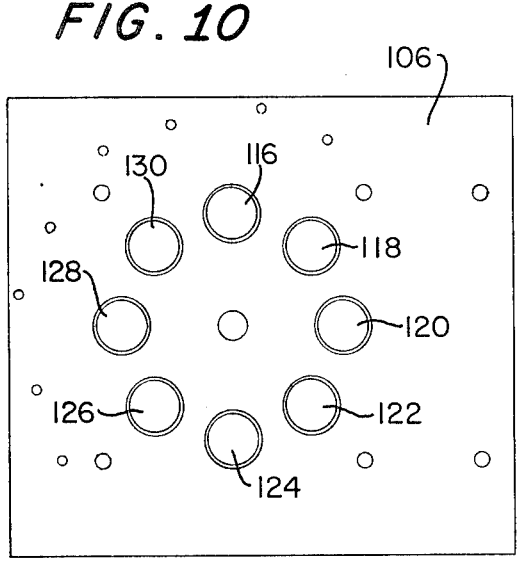
FIG. 10 is a view taken along the line 10—10 of FIG. 9.
Figure 14:
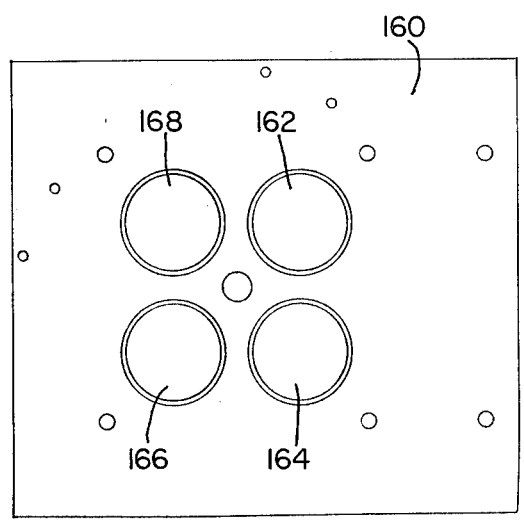
FIG. 14 is a view of the back plate of the second selector mechanism.
Figure 9:
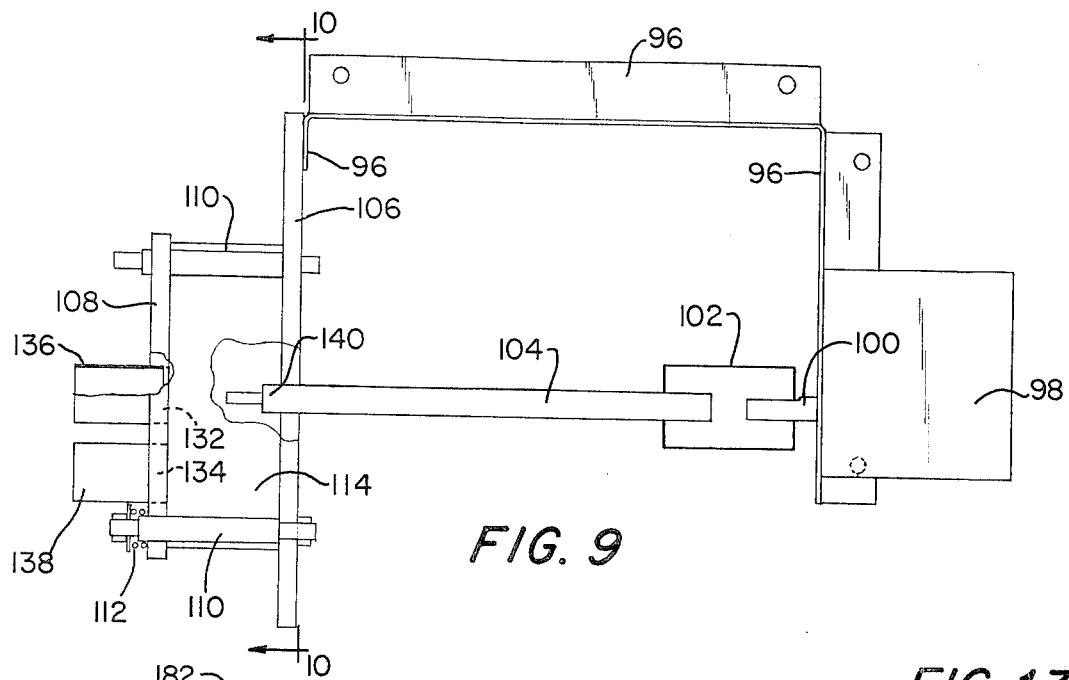
FIG. 9 is a view of a first of the selector mechanisms taken along the line 9—9 of FIG. 8.
Figure 13:
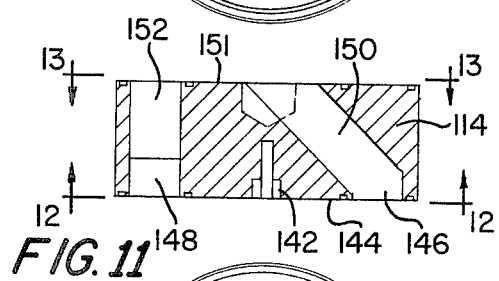
FIGS. 12 and 13 are respectively views taken along the lines 12—12 and 13—13 of FIG. 11.
Figure 16:
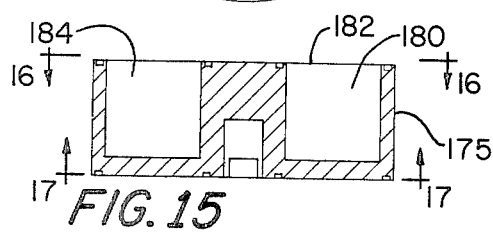
FIGS. 16 and 17 are respectively views taken along the lines 16—16 and 17—17 of FIG. 15.
Figures 11, 15:
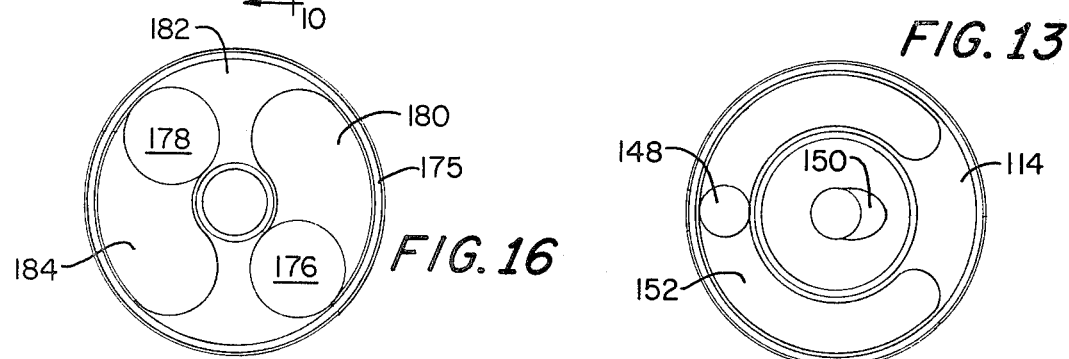
FIG. 11 is a section of the body of the first selector mechanism.
FIG. 15 is a section of the body of the second selector mechanism.
Figure 17:
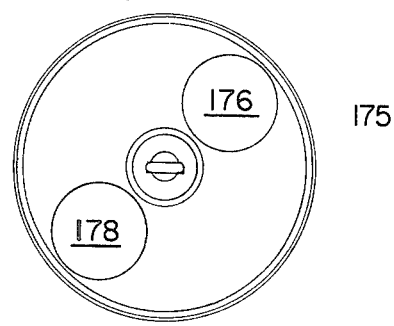
Figure 12:
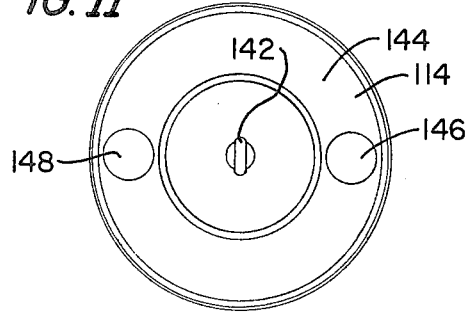

Referring to FIGS. 4 and 5, a heat exchanger 48 is mounted to the tank top 26 by a mounting bracket 50. A motor operated fan or blower 52, a condenser 54, and a compressor 56 are similarly mounted to the tank top 26. An inlet duct 58 is located at one corner of the framework 12 and an outlet duct 60 is located at another corner of the framework. The ducts 58 and 60 extend heightwise of the core 10 between the framework 12 and the tank 24 and are suitably mounted to the framework 12 and/or the tank 24. The ducts 58 and 60 have one or more openings therein along their lengths that communicate with the conditioned space of the building. An enclosure 62, mounted to the tank top 26, so encompasses the heat exchanger 48 as to provide an air path from the inlet duct 58 through an entrance end of the enclosure 62 and then out of an exit end of the enclosure 62 to the outlet duct 60. A damper 64 is located between the inlet duct 58 and the entrance end of the enclosure 62 and is mounted for movement between an open position wherein it permits airflow from the inlet duct 58 to the entrance end of the enclosure 62 and a closed position wherein it precludes such airflow. A damper 66 is located between the exit end of the enclosure 62 and the outlet duct 60 and is mounted for movement between an open position wherein it permits air flow from the exit end of the enclosure 62 and the outlet duct 60 and a closed position wherein it precludes such air flow. A damper 68 is located on the top of the entrance end of the enclosure 62 and is mounted for movement between an open position wherein it permits air flow between the ambient air outside the building through the building air space above the core 10 and the entrance end of the enclosure 62 and a closed position wherein it precludes such air flow. A damper 70 is located on the top of the exit end of the enclosure 62 and is mounted for movement between an open position wherein it permits air flow between the ambient outside the building through the building air space above the core 10 and the exit end of the enclosure and a closed position wherein it precludes such air flow.

Referring to FIGS. 3 and 6, a heat exchanger 72 is located in the upper tank section 44, and a heat exchanger 74 and an evaporator 76 are located in the lower tank section 46. The heat exchanger 74 is at a higher level than the evaporator 76. The heat exchangers 72 and 74 and the evaporator 76 are, as a matter of convenience, located coaxially. The heat exchangers 72 and 74 and the evaporator 76 depend from pipes extending through the tank top 26 with the pipes for the heat exchanger 74 and the evaporator 76 also extending through the grillwork 40 and the barrier 42. A shroud 78, in the form of a hollow sleeve, encompasses the heat exchanger 72 and is mounted to the tank top 26 by a mount 80 depending from the tank top. A shroud 82, also in the form of a hollow sleeve, encompasses the heat exchanger 74 and the evaporator 76 and is mounted to the tank top 26 by a mount 84 that depends from the tank top and extends through the grillwork 40 and the barrier 42. The top and bottom of the shroud 78 is open to the upper tank section 44 and the top and bottom of the shroud 82 is open to the lower tank section 46. The shroud 78 extends a greater distance below than above the heat exchanger 72 and the shroud 82 extends below both the heat exchanger 74 and the evaporator 76 a greater distance than it extends above both the heat exchanger 74 and the evaporator 76. A motor 86, mounted to the tank top 26, is drivingly connected to a shaft 88 that extends through the heat exchanger 72, the grillwork 40, the barrier 42, the heat exchanger 74, and the evaporator 76. A paddle 90 is connected to the shaft 88 interiorly of the heat exchanger 72 and a similar paddle is connected to the shaft 88 interiorly of the heat exchanger 74 and the evaporator 76.

As shown in FIG. 3, selector mechanisms 92 and 94 are mounted to the tank top 26 by a mount 96 with the selector mechanism 92 located above the selector mechanism 94.

Referring to FIGS. 8–13, the selector mechanism 92 includes an indexing motor 98, secured to the mount 96, that rotates a shaft 100. The shaft 100 is connected by a coupling 102 to a shaft 104. The shaft 104 is rotatably mounted in a back plate 106 that is secured to the mount 96. A front plate 108 is spaced from the back plate 106 by pins 110 and is resiliently urged towards the back plate 106 by compression springs 112 mounted on the pins 110. A body 114 is interposed between the plates 106 and 108.

Eight holes 116, 118, 120, 122, 124, 126, 128 and 130 extend through the plate 106 and are spaced evenly from each other and concentrically about the shaft 104. Each of the openings 116, 118, 120, 122, 124, 126, 128 and 130 is coupled to a pipe (see FIG. 20) by a conventional pipe coupling.

Two holes 132 and 134 extend through the plate 108 and are respectively coupled to sleeves 136 and 138. The sleeves 136 and 138 are each connected to a pipe (see FIG. 20) by a conventional pipe coupling. The hole 132 is coaxial with the shaft 104 and the hole 134 is offset from the axis of the shaft 104.

The body 114 is keyed to the shaft 104 for rotation therewith by a key 140 that is fitted into a slot 142. The back face 144 of the body 114, which bears against the plate 106, has a pair of openings 146 and 148 therein that are 180 degrees apart and are spaced from the axis of the shaft 104 an amount equal to the spacing of the holes 116, 118, 120, 122, 124, 126, 128 and 130 from this axis. A skewed passage 150 in the body 114 provides communication between the opening 146 and the hole 132. The front face 151 of the body 114, which bears against the plate 108, is intersected by an arcuate slot 152 in the body 114 which extends concentrically about the body 114 through an arc of less than 360 degrees and intersects the opening 148 midway of its length.

The motor 98 is so constructed as to index the shaft 104, together with the body 114, by rotating the shaft 104 and the body 114 in 45 degrees increments to thus bring a selected one of the holes 116, 118, 120, 122, 124, 126, 128 and 130 into registry with the opening 146 to thus bring this selected hole into communication with the sleeve 136 and the hole 132. The arcuate extent of the slot 152 is such that in seven of the eight indexed positions of the body 114 the slot 152 intersects the hole 134 and provides communication between the hole 134 and that hole of the holes 116, 118, 120, 122, 124, 126, 128 and 130 that is 180 degrees from that one of these holes that is in registry with the opening 146. In the eighth indexed position of the body 114, the slot 152 does not intersect the hole 134.

The selector mechanism 94 has a shaft 100, a coupling 102 and a shaft 104 identical to the corresponding parts of the selector mechanism 92. While having a different construction, the selector mechanism 94 has parts corresponding to and located similarly to the motor 98, the back plate 106, the front plate 108 and the body 114 of the selector mechanism 92.

The motor 156 (FIG. 3) of the selector mechanism 94 is so constructed as to index its shaft 104 by alternately rotating this shaft 90 degrees and 270 degrees in the same direction in response to successive actuations of the motor 156.

Referring to FIGS. 8 and 14–17, the back plate 160 of the selector mechanism 94 has four evenly spaced holes 162, 164, 166 and 168 extending therethrough that are concentric about the axis of its shaft 104. The front plate 170 of the selector mechanism 94 has two holes 172 and 174 extending therethrough that are spaced 180 degrees apart and are located the same distance from the axis of its shaft 104 as the holes in the back plate 160. The body 175 of the selector mechanism 94 has two holes 176 and 178 extending therethrough that are 180 degrees apart and that are also located the same distance from the axis of its shaft 104 as the holes in the back plate 160 and the holes in the front plate 170. An arcuate slot 180 extends partway about the front face 182 of the body 175 and intersects the hole 176 at one of its ends. An arcuate slot 184 extends partway about the front face 172 and intersects the hole 178 at one of its ends.

Figure 20:
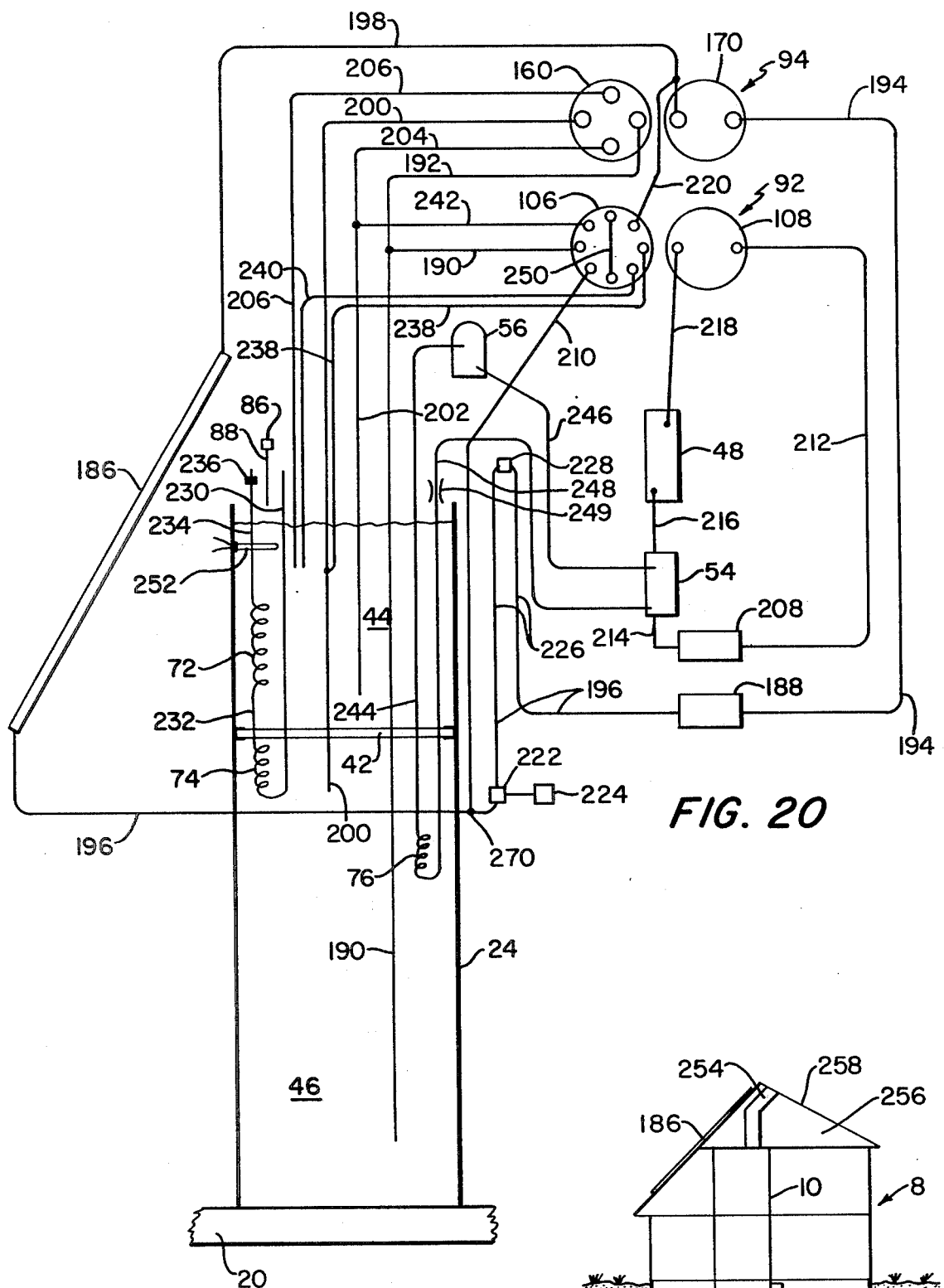
FIG. 20 is a schematic representation of the heat transfer system.

The holes 162, 164, 166, 168, 172 and 174 are connected to pipes by conventional pipe couplings (see FIG. 20).

When the body 175 is placed by the motor 156 in one of its indexed positions, communication will be provided between the holes 172 and 174 and two oppositely disposed holes of the holes 162, 164, 166 and 168 via the holes 176 and 178. When the body 175 is placed by the motor 156 in the other of its indexed positions, communication will be provided between the holes 172 and 174 and two oppositely disposed holes of the holes 162, 164, 166 and 168 via the holes 176 and 178.

Referring to FIGS. 1 and 20, the building 8 includes a solar collector 186 on its roof that is, conventionally, tubing located beneath a cover transparent to solar radiation to heat water in the tubing. The solar collector 186 is used to heat both the upper tank section 44 and the lower tank section 46 which are filled with water.

Figure 2:
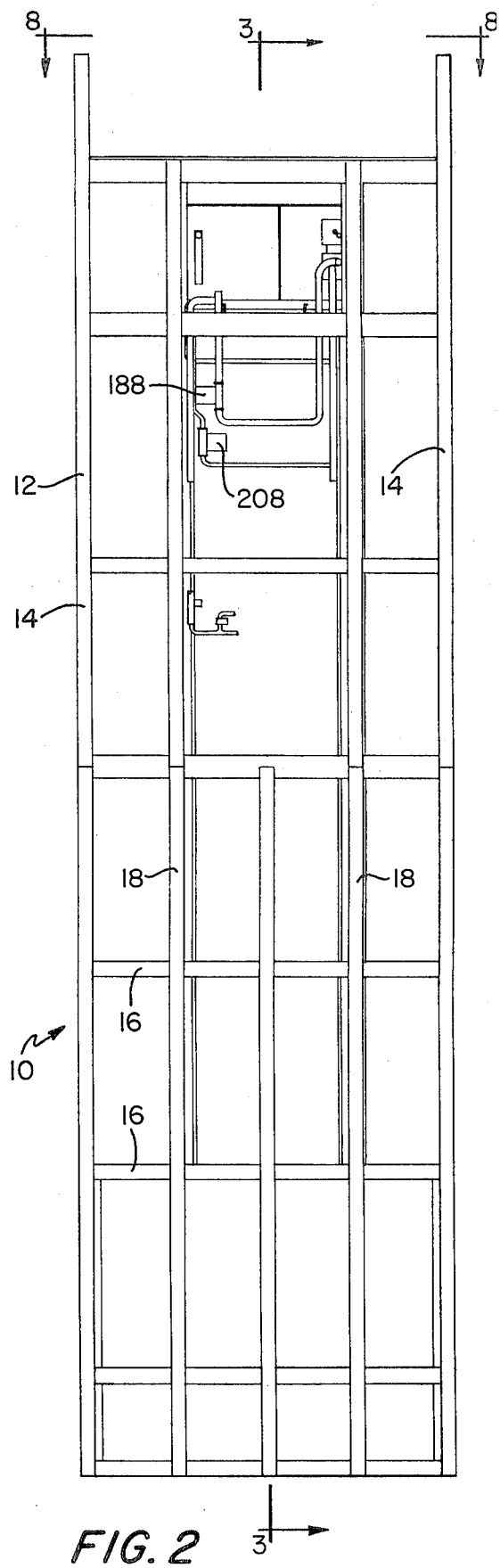
FIG. 2 is an elevation of the core.

In heating the lower tank section 46, the selector mechanism 94 is appropriately indexed by the motor 156. A pump 188, which is, as shown in FIG. 2, mounted between the framework 12 and the tank 24, is used to circulate water to heat the lower tank section 46 from the solar collector 186. Water is drawn by the pump 188 from the lower portion of the lower tank section 46 through a pipe 190, then through a pipe 192, the selector mechanism 94, a pipe 194, the pump 188, a pipe 196, the solar collector 186, a pipe 198, the selector mechanism 94, and a pipe 200 to the upper portion of the lower tank section 46. Since, in a heated water tank, the heated water tends to rise in the tank, this arrangement enables the relatively cool water in the lower portion of the tank section 46 to pass through the solar collector 186, be heated, and then return to the upper portion of the lower section 46.

In heating the upper tank section 44, the selector mechanism 94 is indexed by the motor 156 into a different position. The pump 188 is also used to circulate water to heat the upper tank section 44. Water is drawn by the pump 188 from the lower portion of the upper tank section 44 through a pipe 202, and then through a pipe 204, the selector mechanism 94, the pipe 194, the pump 188, the pipe 196, the solar collector 186, the pipe 198, the selector mechanism 94, and a pipe 206 to the upper portion of the upper tank section 44. As with the lower tank section 46, the arrangement for heating the upper tank section 44 enables the relatively cool water in the lower portion of the upper tank section to pass through the solar collector 186, be heated, and then return to the upper portion of the upper tank section 44.

In heating the two tank sections 44, 46, the same pump 188 is utilized and the same pipes entering and exiting the solar collector 186 are utilized. In order to selectively heat the lower tank section 46 or the upper tank section 44, it is merely required to index the selector mechanism 94 by the motor 156 into one or the other of its positions.

Whenever the solar radiation imparted to the solar collector 186 is insufficient to significantly heat the water in the tank 24, it is desirable to drain water from the solar collector so as to prevent heat loss from the tank 24 to the ambient air and so as to prevent freezing of the water in the solar collector 186 when the temperature of the ambient air falls below the freezing point of the water. In many cases, the upper level of the water in the tank 24 is above the lowest point of the water in the solar collector 186 which necessitates pumping the water from the solar collector 186 back to the tank 24 rather than simply draining the water in the solar collector 186 back to the tank 24 by gravity.

A pump 208, which may, as shown in FIG. 2, be mounted between the framework 12 and the tank 24, is used to drain the water from the solar collector 186 into the tank 24. For this purpose, the selector mechanism 92 is so indexed that water can travel from the solar collector 186 through the pipe 196, a pipe 210, the selector mechanism 92, a pipe 212, the pump 208, a pipe 214, the condenser 54, a pipe 216, the heat exchanger 48, a pipe 218, the selector mechanism 92, and a pipe 220, to the selector mechanism 94. From the selector mechanism 94, the water either flows to the top of the upper tank section 44 via the pipe 206 or to the top of the lower tank section 46 via the pipe 200 depending on whether the selector mechanism 94 is set to supply heated water to the upper tank section 44 or the lower tank section 46 as described above. In this circuit, the condenser 54 and the heat exchanger 48 perform no useful function but are in the circuit as a matter of convenience.

By using the pump 208 and the selector mechanism 92 to drain the water from the solar collector 186, the expensive need to make the pump 188 reversible and provide a four way value to effect its reversal is avoided. The pump 208, when actuated, is controlled by a timer so set as to enable the pump to be operative for a length of time sufficient to allow full drainage of the water in the solar collector 186.

The pipe 196 includes a spring return valve 222 so operated by a solenoid 224 that, when the solenoid is energized, water flows through the pipe 196 without exiting from the pipe 196 by way of the valve 222 and, when the solenoid 224 is deenergized, water in the pipe 196 will drain from the pipe 196 through the valve 122 and then to the building drain. The valve 222 is located below the lowest level of the solar collector 186 and the solenoid 224 is normally energized. The section of the pipe 196 extending between the valve 222 and the pump 188 is formed into an upwardly extending trap 226 having a vent 228 at its apex.

In the event of a power failure, the solenoid 224 is deenergized so that water in the solar collector 186 will drain therefrom through the pipe 196 and the valve 222 without using the powered pump 208. The trap 226 and the vent 228 prevent water from draining from the tank 24 through either the pipe 200 or the pipe 206, depending on the setting of the selector mechanism 94, through the pump 188 and the pipe 196 out through the valve 222 by a siphoning effect when the solenoid 224 is deenergized. The vent 228 takes the form of a check valve which prevents exiting of water therethrough but enables air to flow therethrough into the trap 226. The use of the trap 226 and the vent 228 avoids the need for an expensive valve in the pipe 196 to prevent unwanted water drainage from the tank 24 through the aforementioned siphoning effect.

In order to conserve the electrical power used to energize the solenoid 224 and to increase the longevity of the solenoid 224, the solenoid may be deenergized and thus open the valve 222 after the water in the solar collector 186 has been drained by the circuit that includes the pump 208 as described above. The pipe 196 is connected to the pipe 210 at a lower level than the level of the valve 222 in the pipe 196 to prevent any residue of water left in the section of the pipe 196 extending between the pipe 210 and the solar collector 186 from dripping out of the valve 222 when the draining of the solar collector by the pump 208 has been completed.

The coils of the heat exchangers 72 and 74 form part of a pipe line that is connected to the hot water taps in the building. This pipe line includes a pipe section 230, coming from the source of domestic water for the building, that enters the top of the upper tank section 44 and passes through the upper tank section 44 and the barrier 42 into the top of the lower tank section 46. The bottom of the pipe section 230 communicates with the bottom of the coil of the heat exchanger 74. The top of the coil of the heat exchanger 74 is connected, via a pipe section 232, with the bottom of the coil of the heat exchanger 72. The top of the coil of the heat exchanger 72 is in communication with a pipe section 234 that extends out of the upper tank section 44 and is in communication with the hot water taps of the building.

When a hot water tap is turned on, water is caused to flow from the source of domestic water sequentially through the coils of the heat exchangers 74 and 72, where the water in the coils is heated by heat transfer from the heated water in the tank sections 46 and 44, and then through the pipe section 234 to the hot water tap.

As stated above, the water at the top of each of the tank sections 44 and 46 is hotter than the water at the bottom of each tank section. A temperature sensor 236 in the pipe section 234 is so connected to the motor 86 as to actuate the motor 86 to rotate the shaft 88 and thus rotate the paddles 90 in the heat exchangers 72 and 74 when the heated water flowing through the pipe section 234 is below a desired temperature. The rotation of the paddles 90 within the coils of heat exchangers 72, 74 creates turbulence in the water in the tank 24 in the areas in and around the heat exchanger coils that are encompassed by the shrouds 78 and 82 thus generating an increased impingement of the tank water against the heat exchangers so as to increase the effectiveness of the heat exchangers in heating the water flowing therethrough. The paddles 90 only create a turbulence and circular flow of the tank water within the shrouds 78 and 82 and do not, of themselves, cause movement of the tank water axially of the shrouds and of the heat exchanger coils. During the flow of the water through the heat exchanger coils, the tank water within the shrouds is cooled due to the transfer of heat from the tank water to the water within the heat exchanger coils, Therefore, the cooled tank water in the shrouds sinks because of its greater density resulting in the drawing of replacement hot water into the top of the shrouds. The shrouds thus coact with the heat exchanger coils to create a stream of tank water within the shrouds that flows from the tops to the bottoms of the shrouds in a direction counter to the upward flow of the water to be heated flowing through the heat exchanger coils, thus increasing the efficiency of the heating of the water flowing through the heat exchanger coils. This effect is enhanced by making the shrouds 78 and 82 extend downwardly of coils of their associated heat exchangers 72 and 74 further than they extend upwardly of these coils by increasing the height of the column of relatively cool water flowing downwardly of the heat exchanger coils through the shrouds.

Usually, the heated water in the lower tank section 46 is used to heat the conditioned space. In this operation, the dampers 64 and 66 are open and the dampers 68 and 70 are closed. The blower 52 is causing a flow of air from the inlet duct 58 through the enclosure 62 past the damper 64, the blower 52, the heat exchanger 48 and the damper 66, and then to the outlet duct 60. The pump 208 causes heated water to be drawn from the upper portion of the lower tank section 46 through the pipe 200 and a pipe 238 to the selector mechanism 92. The selector mechanism 92 is so indexed that the water flows from the pipe 238 through the selector mechanism 92 and through the pipe 212, the pump 208, the pipe 214, the condenser 54, the pipe 216, the heat exchanger 48 and the pipe 218. The indexing of the selector mechanism 92 enables the water to flow from the pipe 218 through the selector mechanism 92 and the pipe 190 back to the bottom of the lower tank section 46. Heat is transferred from the heated water flowing through the heat exchanger 48 to the air flowing past the heat exchanger 48 through the enclosure 62, this heated air then passing from the outlet duct 60 into the conditioned space to thereby heat the conditioned space. In this operation, the condenser 54 performs no useful function but is in the water flow circuit as a matter of convenience.

There are occasions when the water in the lower tank section 46 is insufficiently hot to heat the conditioned space and the heated water in the upper tank section 44 is used for this purpose. In this event, with the selector mechanism 92 appropriately indexed, the pump 208 causes heated water to be drawn from the upper portion of the upper tank section 44 through a pipe 240, the selector mechanism 92, the pipe 212, the pump 208, the pipe 214, the condenser 54, the pipe 216, the heat exchanger 48, the pipe 218, the selector mechanism 92, a pipe 242 and the pipe 202 to the lower part of the upper tank selection 44. As in the mode of the preceding paragraph, heat is transferred from the heat exchanger 48 to the air flowing past the heat exchanger 48 through the enclosure 62 to heat this air which then flows into the conditioned space.

The condenser 54, the compressor 56 and the evaporator 76 form a heat pump, through which a refrigerant composition flows, which is utilized to heat the conditioned space when the water temperature in the lower tank section 46 is too low for this purpose and there are sufficient reserves of heated water in the upper tank section 44 for this purpose. The heat pump is rendered operational by turning on the compressor 56 which causes the refrigerant composition, to flow in a closed circuit from the evaporator 76 through a pipe 244, the compressor 56, a pipe 246, the condenser 54, a pipe 248, and a restrictor 249 in the pipe 248 back to the evaporator 76. The refrigerant composition is converted from a liquid to a gas in the evaporator 76 by extracting heat from the water of the lower tank section 24. The compressor 56 increases the pressure of the composition to heat it and this heated gaseous composition is cooled in the condenser 54 into liquid form thereby transferring heat from the composition to water flowing through a water passage in the condenser. This results in the extraction of heat from the lower tank section 46 by the heat pump and the transfer of this heat to the water flowing through the water passage in condenser 54 by way of the pipes 214 and 216. In this mode of operation, the selector mechanism 92 is so indexed that water flows in a closed loop from the pump 208, through the pipe 214, the condenser 54, the pipe 216, the heat exchanger 48, the pipe 218, the plate 108 of the selector mechanism 92, one of the holes in the plate 106 of the selector mechanism 92, a pipe 250, another of the holes in the plate 106, the plate 108 and the pipe 212 back to the pump 208. The water passing through the condenser 54 is heated so as to present heated water to the heat exchanger 48. As in the modes described above, heat is transferred from the heat exchanger 48 to the air flowing past this heat exchanger through the enclosure 62 to heat this air which then flows into the conditioned space.

When using the heat pump, as described in the preceding paragraph, the motor 86 is operated concurrently with the actuation of the compressor 56 to thereby rotate the paddle 90 that is located within the coils of the evaporator 76 thus increasing the efficiency of the evaporator 76 in the same manner as described above with respect to the heat exchangers 72 and 74. As shown in FIGS. 3 and 20, the coil of the evaporator 76 is such that the refrigerant composition flows upwardly through the evaporator coil and the shroud 82 extends downwardly of the evaporator coil a greater distance than it extends upwardly of the evaporator coil to provide the same advantages in transferring heat from the water in the lower tank section 46 as was discussed above in describing the transfer of heat from the water in the tank sections to the heat exchanger coils 72 and 74.

The water in the upper tank section 44 must always be hot enough to transfer heat to the water flowing through the heat exchanger 72 in order to provide domestic hot water. Should the water in the upper tank section 44 cool below this requirement, the heat pump is used to extract heat from the water in the lower tank section 46 and transfer this heat to the upper tank section 44, provided there is sufficient reserve thermal capacity in the water in the lower tank section.

This mode of heating the water in the upper tank section 44 is far more economical than using an electrical resistance heater for this purpose as described below. In this mode, the heat pump circulates the refrigerant composition as described above. With the selector mechanism 92 properly indexed, water is drawn from the bottom of the upper tank section 44 by the pump 208 so as to flow through the pipe 202, the pipe 242, the selector mechanism 92, the pipe 212, the pump 208, the pipe 214, the condenser 54 from which heat is transferred from the refrigerant composition to the water, the pipe 216, the heat exchanger 48 (which is non-functional in this mode), the pipe 218, the selector mechanism 92 and the pipe 240 to the top of the upper tank section 44.

At appropriate seasons, the water in the lower tank section 46 is cooled so that this cool water can be used to cool the conditioned space in the building in the manner described below.

In a first mode of cooling the lower tank section 46, the dampers 64 and 66 are closed, the dampers 68 and 70 are open, and the blower 52 is operating. The blower 52 therefore draws ambient air through the building attic 256 (FIG. 1), the damper 68 and the enclosure 62, past the heat exchanger 48, and then through the damper 70 and the building attic 256 back to the ambient air. One or both of the dampers 68, 70 may be connected to the building roof 258 (FIG. 1) through a duct extending through the attic. With the selector mechanism 92 properly indexed, the pump 208 forces water from the top of the lower tank section 46 through the pipe 200, the pipe 238, the selector mechanism 92, the pipe 212, the pump 208, the pipe 214, the condenser 54 (which is non-functional in this mode), the pipe 216, the heat exchanger 48 where the water is cooled by transfer of heat to the cool air flowing past the heat exchanger, the pipe 218, the selector mechanism 92 and the pipe 190 back to the bottom of the lower tank section 46. This mode is only effective to cool the water in the lower tank section if the ambient air is sufficiently cool.

If the ambient air is not sufficiently cool to enable the water in the lower tank section 46 to be cooled as described in the preceding paragraph, the heat pump comprised of the evaporator 76, the compressor 56 and the condenser 54 may be utilized for cooling the water in the lower tank section 46. In this mode, the water flows through the same closed circuit and the heat pump is operated in the same manner as described above in the use of the heat pump to heat the conditioned space from water in the lower tank section 46. The air flow from the ambient air past the heat exchanger 48 and then back to ambient air is the same as that described in the preceding paragraph. Therefore the heat in the heat exchanger 48, that originated in the lower tank section 46 is transferred to air that flows to the ambient instead of to the conditioned space in the building thereby cooling the water in the lower tank section 46.

With the water in the lower tank section 46 cooled in accordance with one of the modes described in the preceding two paragraphs, this cooled water may be used, in appropriate seasons, to cool the conditioned space in the building. In this mode, the dampers 64 and 66 are open, the dampers 68 and 70 are closed, and the blower 52 forces air in the same path as in the mode described above where water from the lower tank section 46 is used to heat the conditioned space. In this mode, with the selector mechanism 92 properly indexed, the pump 208 draws water from the bottom of the lower tank section 46 through the pipe 190, the selector 92, the pipe 212, the pump 208, the pipe 214, the condenser 54 (which is non-functional in this mode), the pipe 216, the heat exchanger 48 where heat from the passing air is transferred into the water so as to cool the air which then flows into the conditioned space, the pipe 218, the selector mechanism 92, the pipe 238, and the pipe 200 back to the top of the lower tank section 46.

As described above, the heat pump is used to extract heat from the lower tank section 46 and transfer it to the upper tank section 44. However, if the temperature of the water in the lower tank section 46 is above a certain amount (e.g. 70° F.), with compressors currently available, operation of the heat pump could damage the compressor 56 of the heat pump. If the temperature of the water in the lower tank section is below a certain amount (e.g. 45° F.), operating the heat pump woul cause the temperature of the water in the lower tank section 46 to fall to an unacceptably low level and perhaps freeze which would be detrimental to the efficiency of the system. In either of these circumstances, an electrical resistance heater 252 in the upper tank section 44 is turned on to heat the water in the upper tank section. Normally, it is desirable to heat the water in the upper tank section 44 by the heat pump instead of the resistance heater since the heat pump uses far less energy.

Referring FIGS. 1 and 5, a duct 254 is located above and is in communication with the damper 68, the duct 254 extending through the attic 256 of the building 8 and communicating with the ambient air through the building roof 258. As shown in FIG. 18, a damper 260 is hinged to the top of the inlet duct 58 in the attic 256 and is so constructed as to normally be closed and to open upwardly only when there is superatmospheric pressure in the duct 58.

At appropriate seasons, it is desirable to vent the conditioned space and the attic 256 by drawing air from the ambient and forcing it through the conditioned space and back to the ambient. When operating this mode of the system, the dampers 66 and 68 are open and the dampers 64 and 70 are closed, as shown in FIGS. 4 and 5, and the blower 52 is operating. The blower 52 draws ambient air through the duct 254, the damper 68 and the enclosure 62 past the blower 52 and then through the damper 66, the outlet duct 60, the conditioned space and the inlet duct 58. This creates a superatmospheric pressure in the duct 58 which causes the damper 260 to open so that the air may blow through the damper 260 and the attic 256 back to the ambient. In all other modes of operation, the air pressure at the top of the duct 58 adjacent the damper 260 is slightly below atmospheric so that the damper 260 stays closed. This mode of operation allows complete ventilation of the conditioned space without opening any windows. When this mode is in operation, the building is not being heated or cooled so as to avoid any conflict with this mode of operation.

Referring to FIG. 19, the enclosure 62 is in communication with the upper tank section 44 via a damper 262 in a duct 263 on the exit side of the blower 52 and via a damper 264 in a duct 265 on the entrance side of the blower 52. When the system is used to heat the conditioned space, as described above, the normally closed dampers 262 and 264 are caused to open, as by a humidistat, so that part of the air exiting from the blower 52 will pass through the damper 262, through the moist air in the space between the tank top 26 and the top of the water in the tank section 44 and thereby pick up water vapor from this moist air and carry the water vapor along with the air through the damper 264. This humidified air will then pass through the enclosure 62 and the outlet duct 60 into the conditioned space so as to humidify the air in the conditioned space. A mineral trap of porous material 266 floats on top of the water in the upper tank section 44. The material 266 is so constituted that water passes therethrough by capillary action but minerals in the water are trapped by the material. As a result the mineral trap 266 collects the minerals in the water with the passage of time as water is added to the tank 24 so that there will not be such a great accumulation of the minerals in the tank water as to precipitate in the tank or in the pipes of the system.

A float valve ball 268 (FIG. 3) floats on top of the water in the upper tank section 44 and admits water into the upper tank section 44 through a pipe (not shown) as the water in the upper tank section 44 is depleted.

There follows a recapitulation of the features of this disclosure that relate to its inventive features.

The heat transfer system comprises: the tank section 46 adapted to contain water; the heat exchanger 48; the condenser 54 having the water passage therein; the evaporator 76, located in the tank section 46, adapted to be immersed in the water in the tank section 46; the pipes 248, 244 and 246 and the compressor 56 which act as a refrigerant composition flow means for causing refrigerant composition to flow in a closed circuit from the evaporator 76 to the condenser 54 and back to the evaporator 76; the condenser, the evaporator and the refrigerant composition flow means forming a heat pump so constituted that heat is extracted by the evaporator 76 from the water in the tank section 46 and is transferred by the condenser 54 to water flowing through the water passage; the pump 208; the selector mechanism 92 movable between a first position and a second position; the conduits 212, 214, 216 and 218 which form a common conduit extending from the selector mechanism 92 through the pump 208, the water passage in the condenser 54 and the heat exchanger 48 back to the selector mechanism 92; the pipes 200 and 238 which form an outflow conduit extending between the tank section 46 and the selector mechanism 92; and the pipe 190 which forms a return conduit extending between the tank section 46 and the selector mechanism 92. The selector mechanism 92 is so constructed and arranged that when the selector mechanism 92 is in its first position the pump 208 causes water to flow sequentially through the outflow conduit 200, 238, the selector mechanism 92, the common conduit 212, 214, 216, 218, the selector mechanism 92 and the return conduit 190 back to the tank section, and when the selector mechanism is in its second position the pump 208 causes water to flow in a closed loop through the common conduit 212, 214, 216, 218.

The tank section 46 is a first tank section, the outflow conduit 200, 238 is a first outflow conduit, the return conduit 190 is a first return conduit, and the selector mechanism 92 is movable between the first and second positions and a third position. The system further comprises: the second tank section 44; the pipe 240 which forms a second outflow conduit extending between the second tank section 44 and the selector mechanism 92; and the pipes 202, 242 which forms a second return conduit extending between the second tank section 44 and the selector mechanism 92. The selector mechanism 92 is so constructed and arranged that when the selector mechanism 92 is in its third position the pump 208 causes water to flow sequentially from the second tank section 44 through the second outflow conduit 240, the selector mechanism 92, the common conduit 212, 214, 216, 218, the selector mechanism 92, and the second return conduit 202, 242 back to the second tank section 44.

The selector mechanism 92 is movable between the first and second positions and an additional position. The outflow conduit 200, 238 extends into the water at the top of the tank section 46. The return conduit 190 extends into the water at the bottom of the tank section 46. The selector mechanism 92 is so constructed and arranged that when the selector mechanism 92 is in its additional position the pump 208 causes water to flow sequentially from the tank section 46 through the return conduit 190, the selector mechanism 92, the common conduit 212, 214, 216, 218, the selector mechanism 92, and the outflow conduit 200, 238 back to the tank section 46.

I claim:

1. A heat transfer system comprising: a tank section adapted to contain water; a heat exchanger; a condenser having a water passage therein; an evaporator, located in the tank section, adapted to be immersed in the water in the tank section; refrigerant composition flow means for causing refrigerant composition to flow in a closed circuit from the evaporator to the condenser and back to the evaporator; said condenser, evaporator and refrigerant composition flow means forming a heat pump so constituted that heat is extracted by the evaporator from the water in the tank section and is transferred by the condenser from the refrigerant composition to water flowing through the water passage; a pump; a single selector mechanism movable between a first position and a second position; a common conduit extending from the selector mechanism through the pump, the water passage, and the heat exchanger back to the selector mechanism; an outflow conduit extending between the tank section and the selector mechanism; and a return conduit extending between the tank section and the selector mechanism; and wherein the selector mechanism is so constructed and arranged that when the selector mechanism is in its first position the pump causes water to flow sequentially from the tank section through the outflow conduit, the selector mechanism, the common conduit, the selector mechanism, and the return conduit back to the tank section, and when the selector mechanism is in its second position the pump causes water to flow in a closed loop through the common conduit.

2. The heat transfer system of claim 1 wherein said tank section is a first tank section, wherein said outflow conduit is a first outflow conduit, wherein said return conduit is a first return conduit, and wherein said selector mechanism is movable between said first and second positions and a third position; further comprising: a second tank section; a second outflow conduit extending between the second tank section and the selector mechanism; and a second return conduit extending between the second tank section and the selector mechanism; and wherein the selector mechanism is so constructed and arranged that when the selector mechanism is in its third position the pump causes water to flow sequentially from the second tank section through the second outflow conduit, the selector mechanism, the common conduit, the selector mechanism, and the second return conduit back to the second tank section.

3. The heat transfer system of claim 1 wherein the selector mechanism is movable between said first and second positions and an additional position; wherein said outflow conduit extends into the water at the top of the tank section; wherein the return conduit extends into the water at the bottom of the tank section; and wherein the selector mechanism is so constructed and arranged that when the selector mechanism is in its additional position the pump causes water to flow sequentially from the tank section through the return conduit, the selector mechanism, the common conduit, the selector mechanism, and the outflow conduit back to the tank section.

* * * * *